United States Patent
Wong

(10) Patent No.: US 9,759,597 B2
(45) Date of Patent: Sep. 12, 2017

(54) METHODS FOR CALIBRATING A FUGITIVE EMISSION RATE MEASUREMENT

(71) Applicant: Golder Associates Ltd., Burnaby (CA)

(72) Inventor: Colin Irvin Wong, Burnaby (CA)

(73) Assignee: Golder Associates Ltd., Vancouver, BC (CA)

(*) Notice: Subject to any disclaimer, the term of this patent is extended or adjusted under 35 U.S.C. 154(b) by 656 days.

(21) Appl. No.: 14/186,612

(22) Filed: Feb. 21, 2014

(65) Prior Publication Data
US 2014/0236521 A1 Aug. 21, 2014

Related U.S. Application Data

(60) Provisional application No. 61/767,580, filed on Feb. 21, 2013.

(51) Int. Cl.
*G01F 25/00* (2006.01)
*G01P 21/02* (2006.01)

(52) U.S. Cl.
CPC .......... *G01F 25/0007* (2013.01); *G01P 21/02* (2013.01)

(58) Field of Classification Search
CPC ..... G01F 25/0007; G01F 25/00; G01N 21/00; G01N 33/00; G01N 33/0004
See application file for complete search history.

(56) References Cited

U.S. PATENT DOCUMENTS

| | | | |
|---|---|---|---|
| 4,135,092 A | 1/1979 | Milly | |
| 4,204,121 A | 5/1980 | Milly | |
| 5,521,883 A | 5/1996 | Fage | |
| 5,604,299 A | 2/1997 | Cobb | |
| 5,742,053 A | 4/1998 | Rekunyk | |

(Continued)

FOREIGN PATENT DOCUMENTS

| | | |
|---|---|---|
| AU | 2010305239 B2 | 4/2011 |
| CA | 2219335 C | 11/1997 |

(Continued)

OTHER PUBLICATIONS

Rege et al., Estimation of Point-Source Emissions of Hydrogen Sulfide and Ammonia Using a Modified Pasquill-Gifford Approach, 1996, Atmospheric Environment, vol. 30, No. 18, pp. 3181-3195.*

(Continued)

*Primary Examiner* — Toan Le
(74) *Attorney, Agent, or Firm* — Ballard Spahr LLP

(57) ABSTRACT

Methods for calibrating an emission rate measurement of a gas are provided. The methods involve discharging a reference gas that is the same or a different composition than a subject gas. If the same or similar, then a combined emission rate of the reference and subject gas is measured, as well as an emission rate of the subject gas only. A deviation, or an one or more adjusted parameter, of the combined and subject gas measurement from the reference gas discharge rate is used to calibrate the subject gas measurement. If the reference gas is different, the emission rates of the subject and reference gas are measured, and a deviation, or an one or more adjusted parameter, of the measured rate from the discharge rate of the reference gas is used in calibrating the subject gas measurement. The methods may also use a modified 2-D tracer measurement as a reference.

14 Claims, 6 Drawing Sheets

(56) References Cited

U.S. PATENT DOCUMENTS

| | | |
|---|---|---|
| 5,748,325 A | 5/1998 | Tulip |
| 6,064,488 A | 5/2000 | Brand et al. |
| 6,317,080 B1 | 11/2001 | Baxter, Jr. |
| 6,421,127 B1 | 7/2002 | McAndrew et al. |
| 6,493,086 B1 | 12/2002 | McAndrew |
| 6,542,242 B1 | 4/2003 | Yost |
| 6,750,467 B2 | 6/2004 | Tulip |
| 6,822,742 B1 | 11/2004 | Kalayeh |
| 6,864,983 B2 | 3/2005 | Galle |
| 6,941,806 B2 | 9/2005 | Burns et al. |
| 6,995,846 B2 | 2/2006 | Kalayeh |
| 7,166,843 B2 | 1/2007 | May |
| 7,312,452 B2 | 12/2007 | Klingenberg |
| 7,375,814 B2 | 5/2008 | Reichardt |
| 7,383,129 B1 | 6/2008 | Baillot et al. |
| 7,501,629 B2 | 3/2009 | Hashmonay |
| 7,523,638 B2 | 4/2009 | Princes |
| 8,010,300 B1 | 8/2011 | Sterns |
| 8,294,899 B2 | 10/2012 | Wong |
| 2008/0195329 A1 | 8/2008 | Prince et al. |
| 2010/0091267 A1 | 4/2010 | Wong |
| 2011/0122397 A1 | 5/2011 | Wong |
| 2014/0019066 A1 | 1/2014 | Prince |

FOREIGN PATENT DOCUMENTS

| | | |
|---|---|---|
| CA | 2550156 A1 | 7/2005 |
| CA | 2675173 A1 | 7/2008 |
| CA | 2655279 A1 | 5/2009 |
| CA | 2715677 C | 12/2010 |
| EP | 1972922 A1 | 9/2008 |
| WO | 2011041908 A1 | 4/2011 |

OTHER PUBLICATIONS

Spokas et al., Methane Mass Balance at Three Landfill Sites: What is the Efficiency of Capture by Gas Collection Systems?, 2006, Waste Management 26, pp. 516-525.*

Wong, C., and Ramkellawan, J., 2013, "Calibration of a fugitive emission rate measurement of an area source", Journal of the Air & Waste Management Association, vol. 63, No. 11, pp. 1324-1334.

Wong, C., and Wyles, R., 2012, "Mapping concentrations of airborne matter to quantify the fugitive emissions discharge rate from a landfill", Greenhouse Gas Measurement & Management, vol. 21, No. 1, pp. 50-60.

Babilotte, A. et al., "Fugitive methane emissions from landfills: A field comparison of five methods on a French landfill", Global Waste Management Symposium, Colorado, Sep. 7-10, 2008.

Babilotte, A. et al. 2009 :Field intercomparison of methods to measure fugitive methane emissions on landfills. Proceedings Sardinia 2009, 12th International Waste Management and Landfill Symposium S. Margherita de Pula Cagliari, Italy Oct. 5-9, 2009.

Babilotte, A. et al., "Fugitive Methane Emissions from Landfills: Field Comparison of Five Methods on a French Landfill." Journal of Environmental Engineering 136(8): 777-784, 2010.

Babilotte, A., 2011, "Field Comparison of Methods for Assessment of Fugitive Methane Emissions from Landfills." Report for the Environmental Research & Education Foundation, Jan. 2011.

Balfour et al, "Evaluation of Air Emissions from Hazardous Waste Treatment, Storage, and Disposal Facilities" USEPA, Jun. 1984.

Brown, D.M., "Remote sensing techniques in the infrared region of the electromagnetic spectrum", MSc Thesis, The Pennsylvania State University, Department of Electrical Engineering, May 2005.

Chambers, A., "Optical Measurement Technology for Fugitive Emissions from Upstream Oil and Gas Facilities", report prepared by Alberta Research Council Inc., Dec. 15, 2004.

Chambers, A., et.al, "DIAL Measurements of Fugitive Emissions from Natural Gas Plants and the Comparison with Emission Factor Estimates", 15th International Emission Inventory Conference, New Orleans, May 15-18, 2006.

Chambers, A., Strosher, M., Wootton, T., Moncrieff, J., and McCready, P., (2008), "Direct Measurement of Fugitive Emissions of Hydrocarbons from a Refinery", Journal of the Air & Waste Management Association, 58:1047-1056.

Czepiel, et.al, "Landfill methane emissions measured by enclosure and atmospheric tracer methods", Journal of Geophysical Research, vol. 101, No. D11: 16,711-16,719, 1996.

Denmead, O.T., "Approaches to measuring fluxes of methan and nitrous oxide between landscapes and the atmosphere", Plant Soil 309: 5-24, 2008.

Desjardins, R.L., et al., "Evaluation of a micrometeorological mass balance method employing an open-path laser for measuring methan emissions", Atmospheric Environment 38: 6855-6866, 2004.

Flesch, T.K., et al. / Atmospheric Environment 39 (2005) 4863-4874.

Flesch, T.K., J.D. Wilson, and Yee, E. 1995, "Backward-Time Lagrangian Stochastic Dispersion Models and Their Application to Estimate Gaseous Emissions". Journal of Applied Meteorology, 34:1320-1332.

Frisch, L., "Fugitive VOC-emissions measured at Oil Refineries in the Province of Vastra Gotaland in South West Sweden—a success story", development and results 1986-2001 commissioned by the County Administration of Västra Götaland.

Galle, et al. Environ. Sci. Technol. 2001, 35, 21-25.

Gerilowski, K., et.al., "MAMAP—a new spectrometer system for column-averaged methane and carbon dioxide observations from aircraft: instrument description and performance analysis", Atmospheric Measurement Techniques, 4: 215-243, 2011.

Gregory, R and Armstrong, K. Review of Landfill Surface Emissions Monitoring DEFRA Report, Jun. 11, 2007 (74 pp).

Gregory, R.G. and Armstrong, K.S., "Review of Landfill Surface Emissions Monitoring", presented at Global Waste Management Symposium, Colorado, USA, Sep. 7-10, 2008.

Griffith, D., et.al., "Methane Emissions from Free-Ranging Cattle: Comparison of Tracer and Integrated Horizontal Flux Techniques", Journal of Environmental Quality, vol. 37, Issue 2: 582-591, Mar./Apr. 2008.

Hashmonay et al., "Innovative Approach for Estimating Fugitive Gaseous Fluxes Using Computed Tomography and Remote Optical Sensing Techniques", Journal of the Air & Waste Management Association 49: 966-972, 1999.

Hensen, A., & Scharff, H., "Methane Emission Estimates from Landfills Obtained with Dynamic Plume Measurements", Water, Air and Soil Pollution: Focus, vol. 1, No. 5-6, 455-464(10), 2001.

Howard, T., Lamb, B., Bamesberger, W., Zimmerman, P. 1992. "Measurement of Hydrocarbon Emissions Fluxes from Refinery Wastewater Impoundments Using Atmospheric Tracer Techniques", Journal of the Air & Waste Management Association, 42:1336-1344.

Huitric, R.L., and Kong, D., "Measuring Landfill Gas Collection Efficiency Using Surface Methane Concentrations", SWANA 29th Annual LFG Symposium, St. Petersburg, Florida, Mar. 27-30, 2006.

Lamb, B., Westberg, H., and Allwine, G. 1986, "Isoprene Emission Fluxes Determined by an Atmospheric Tracer Technique", Atmospheric Environment, vol. 20, No. 1, pp. 1-8.

Lamb, B., et.al., "Development of Atmospheric Tracer Methods to Measure Methane Emissions from Natural Gas Facilities and Urban Areas", Environmental Science & Technology, vol. 29, pp. 1468-1479, 1995.

Laubach, J., and Kelliher, F., "Methane emissions from dairy cows: Comparing open-path laser measurements to profile-based techniques", Agricultural and Forest Meteorology, 135, pp. 340-345, 2005.

Lenz, Dawn et al., "Flight Testing of an Advanced Airborne Natural Gas Leak Detection System", Final Report, ITT Industries Space Systems LLC, Rochester, NY, Oct. 2005. [http://www.netl.doe.gov/technologies/oil-gas/publications/td/41877_final.PDF].

Mays et.al "Aircraft-Based Measurements of the Carbon Footprint of Indianapolis" from the Oct. 15, 2009 issue of Environmental Science & Technology.

Mellqvist, J., Kihlman, M., Samuelsson, J., and Galle, B., 2005, "The Solar Occultation Flux (SOP) Method, a new technique for the

(56) References Cited

OTHER PUBLICATIONS quantification of fugitive emissions of VOCs." Proceedings of A&WMA's 98th Annual Conference & Exhibition, Minneapolis, USA.
Milly, G.H., "The Vertical Grid Assessment of Air Pollution Sources", Int. J. Air Wat. Poll. 8: 291-295, 1964.
Mount, G. et.al, "DOAS Measurement of Atmospheric Ammonia Emissions at a Dairy", 10th Annual Emission Inventory Conference, EPA, 2001.
Oonk, H., "Literature Review: Methane from Landfills. Methods to Quantify Generation, Oxidation and Emission", Report for Sustaintable Landfill Foundation, Apr. 2010.
Piccot, S., Masemore, S., Ringler, E., Srinivasan, Kirchgessner, D., and Herget, W., "Validation of a method for estimating pollution emission rates from area sources using open-path FTIR spectroscopy and dispersion modeling techniques", Air & Waste, 44:3, 271-279. 1994.
Rella et al., AGU Fall 2009.
Ryerson, T.B. et al. Science vol. 292 Apr. 27, 2001.
Sackinger, Philip A., et al (1982) Uncertainties Associated with the Estimation of Mass Balances and Gaussian Parameters from Atmospheric Tracer Studies, Journal of the Air Pollution Control Association, 32:7, 720-724.
Scharff, H., et al. 2003. A Comparison of Measurement Methods to Determine Landfill Methane Emissions, Novem Report prepared by Afvalzorg Deponie BV, ECN-SF, TNO-MEP, and IGAT BV.
Scharff, H., "Landfill Gas Production and Emission on Former Landfill", Interreg IIIC report (on the internet), Oct. 2005.
Scheutz, C., et al. Sardinia 2007, Eleventh International Waste Management and Landfill Symposium.
Sivertson, B., 1983, Estimation of Diffuse Hydrocarbon Leakages from Petrochemical Factories, Journal of the Air Pollution Control Association, 33:4, pp. 323-327.
Thoma, E., et.al, "Development of EPA OTM 10 for Landfill Applications Interim Report 2", Global Waste Management Symposium, Colorado, USA, Sep. 7-10, 2008.
Thornton, E. & Bowmar, N., "The Application of a Laser Based Open-Path Spectrometer for the Measurement of Fugitive Emissions and Process Control", A & WM Association Conference, Raleigh, North Carolina, Oct. 28, 1999.
Trainer, M., et al., 1995: Regional ozone and urban plumes in the southeastern United States: Birmingham, a case study. Journal of Geophysical Research, 100 (D9), pp. 18,823-18,834.
Trégourès, A., et.al., "Comparison of seven methods for measuring methane flux at a municipal solid waste landfill site", Waste Management & Research, 17: 453-458, 1999.
USEPA, "Evaluation of Fugitive Emissions Using Ground-based Optical Remote Sensing Technology", EPA 600/R-07/032, Feb. 2007. [http://www.epa.gov/nrmrl/pubs/600r07032/600r07032.pdf].
USEPA, "Optical Remote Sensing for Emission Characterization from Non-point Sources", OTM 10, Jun. 14, 2006.
Van den Kroonenberg, A. and Bange, J. "Turbulent flux calculation in the polar stable boundary layer: Multiresolution flux decomposition and wavelet analysis" Journal of Geophysical Research 112:, DO06112, doi:10.1029/2006JD007819, 2007.
Varma, R.M., 2004, Optical Remote Sensing for Air Quality Monitoring, Agra, India, Dec. 6-8, 2004.
Veolia ES Solid Waste, GWMS, 2012.
Weibring, P. et.al, "Remote monitoring of industrial emissions by combination of lidar and plume velocity measurements", Applied Physics B Lasers and Optics, 66: 383-388, 1998.
Whiteman, D.N. et al., "Raman Airborne Spectroscopic Lidar (RASL)—Final Report", Ralcon Development Labs, Sep. 30, 2002. [http://ramanlidar.gsfc.nasa.gov/instruments/raman%20airborne %20spectroscopic%20lidar/rasl-final-report.pdf].

Office Action dated on Jun. 3, 2009 for Canadian Patent Application No. 2,655,279.
Office Action dated Oct. 7, 2009 for Canadian Patent Application No. 2,655,279.
Office Action dated May 19, 2010 for Canadian Patent Application No. 2,655,279.
Office Action issued Jul. 2, 2010 for Canadian Patent Application No. 2,681,681.
International Search Report and Written Opinion dated Jan. 25, 2011 for PCT/CA2010/001614.
Office Action issued Feb. 1, 2011 for Canadian Patent Application No. 2,715,677.
Office Action issued Feb. 7, 2011 for U.S. Appl. No. 12/575,854.
Notice of Allowance issued Jul. 12, 2011 for Canadian Patent Application No. 2,715,677.
Office Action issued Aug. 19, 2011 for U.S. Appl. No. 12/575,854.
Office Action issued Jan. 6, 2012 for U.S. Appl. No. 12/964,149.
Notice of Allowance dated Sep. 17, 2012 for U.S. Appl. No. 13/379,811.
Advisory Action issued Sep. 27, 2012 for U.S. Appl. No. 12/964,149.
Office Action issued Mar. 15, 2013 for Australian Patent Application No. 2010305239.
Notice of Allowance dated May 13, 2013, for Australian Patent Application No. 2010305239.
Office Action dated Nov. 15, 2013 for Canadian Patent Application No. 2,655,279.
Notice of Allowance dated May 5, 2014, for U.S. Appl. No. 12/964,149.
Office Action issued Jul. 5, 2012 for U.S. Appl. No. 12/964,149.
Banta et al., "Evolution of the Monterey Bay Sea-Breeze Layer as Observed by Pulsed Doppler Lidar," Journal of the Atmospheric Sciences, vol. 50, No. 24, pp. 3959-3982, Dec. 15, 1993; NOAA/ERL Wave Propagation Laboratory, Boulder, Colorado.
Fredriksson et al.; "Evaluation of the Dial Technique for Studies on NO2 Using a Mobile Lidar System," Applied Optics, 23(9), 1403-1411. May 1, 1984.
Fredriksson et al.; "Lidar System Applied in Atmospheric Pollution Monitoring", Applied Optics, 15(17), 2998-3003. Sep. 1, 1979.
Nasser, Robert, Non-Final Office Action from counterpart U.S. Appl. No. 14/067,536, Nov. 13, 2014, pp. 1-16, United States Patent and Trademark Office, Alexandria, Virginia USA.
Ton, Tri T, Restriction Requirement from counterpart U.S. Appl. No. 14/067,536, May 26, 2014, pp. 1-5, United States Patent and Trademark Office, Alexandria, Virginia USA.
Nasser, Robert L., Non-Final Office Action from counterpart U.S. Appl. No. 14/067,536, Apr. 1, 2015, pp. 1-19, United States Patent and Trademark Office, Alexandria, Virginia USA.
Nasser, Robert L., Final Office Action from counterpart U.S. Appl. No. 14/067,536, Oct. 26, 2015, pp. 1-19, United States Patent and Trademark Office, Alexandria, Virginia USA.
Nasser, Robert L., Non-Final Office Action from counterpart U.S. Appl. No. 14/542,835, Oct. 27, 2015, pp. 1-13, United States Patent and Trademark Office, Alexandria, Virginia USA.
Nasser, Robert L., Non-Final Office Action from counterpart U.S. Appl. No. 14/542,835, Feb. 24, 2016, pp. 1-15, United States Patent and Trademark Office, Alexandria, Virginia USA.
Nasser, Robert L., Advisory Action from counterpart U.S. Appl. No. 14/067,536, Feb. 25, 2016, pp. 1-7, United States Patent and Trademark Office, Alexandria, Virginia USA.
Nasser, Robert L., Non-Final Office Action from counterpart U.S. Appl. No. 14/542,835, Aug. 16, 2016, pp. 1-18, United States Patent and Trademark Office, Alexandria, Virginia USA.
Nasser, Robert L., Non-Final Office Action from counterpart U.S. Appl. No. 14/067,536, Aug. 18, 2016, p. 1-25, United States Patent and Trademark Office, Alexandria, Virginia USA.

* cited by examiner

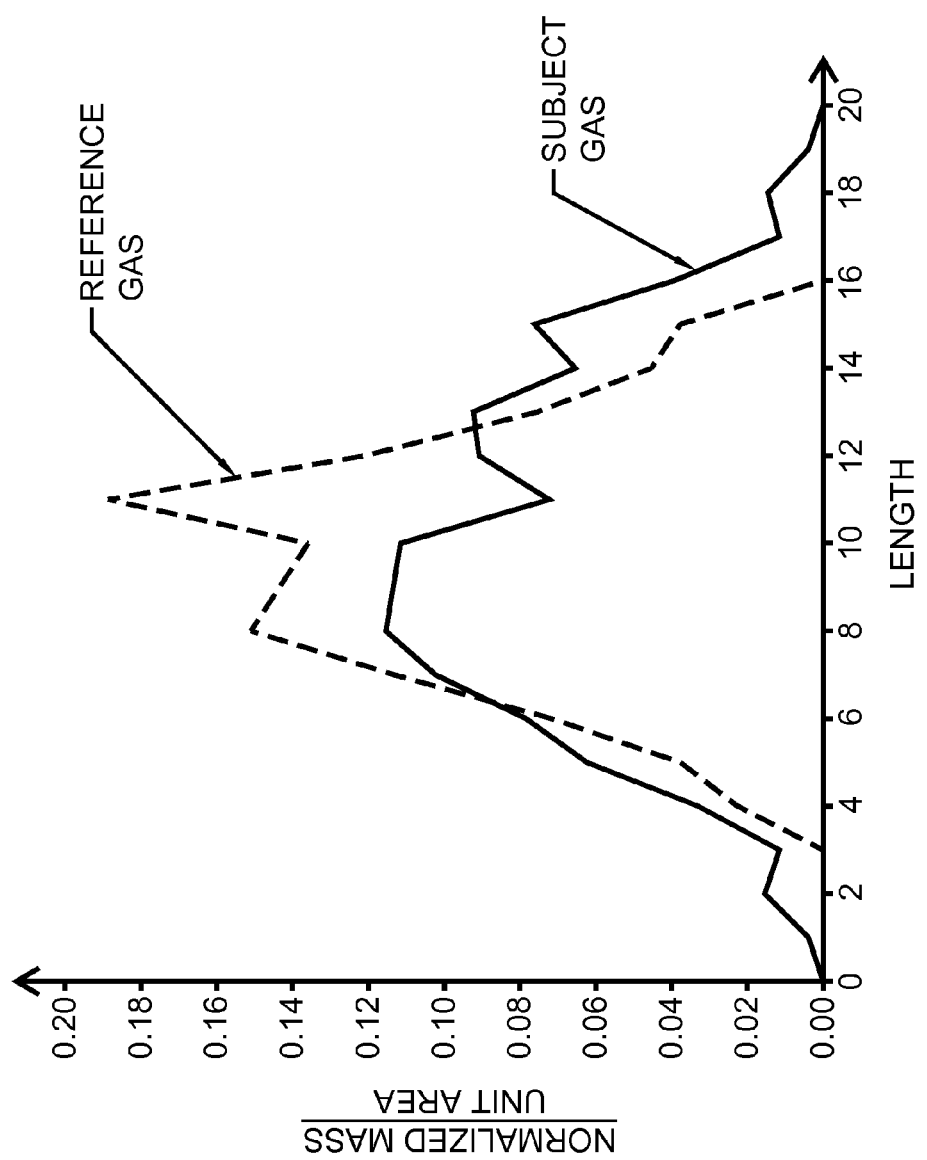

METHODS FOR CALIBRATING A FUGITIVE EMISSION RATE MEASUREMENT

CROSS REFERENCE TO RELATED APPLICATION

This application is based upon and claims priority to U.S. Provisional Application No. 61/767,580 filed Feb. 21, 2013, which application is hereby incorporated by reference herein.

FIELD OF THE INVENTION

The present disclosure is directed at methods for calibrating a fugitive emission rate measurement.

BACKGROUND

Area facilities, such as landfills, mines, tailing ponds, farms and collections of point sources such as industrial plants, can be a source of fugitive emissions of airborne matter that can contribute to a change in the local, regional and global air quality. Several techniques and methodologies have been developed and used to measure the fugitive emission rates from such area facilities. Such methodologies, however, have been hindered by confidence in, and uncertainties pertaining to, the accuracy of the methodologies. There is, therefore, a need to calibrate the measurement of the fugitive emission rate of a gas or gases from a source of interest (subject gas), large area sources in particular (see, for example, Tregoures et. al (1999), Babilotte et. al (2010) and Babilotte (2011)).

Several studies (e.g., Tregoures et. al (1999), Babilotte et. al (2010) and Babilotte (2011)) have tested a number of different methods for measuring fugitive emission rates and compared the results of these methods to each other. These studies, however, were unable to determine the accuracy of the methods relative to the actual emission rate from the landfills being measured. Thoma et. al, (2010) describes a method for validating measuring fugitive emission rates but does not describe methods for calibrating a particular fugitive emission rate measurement.

Lamb et al. (1986) and Howard et al. (1992) describe a tracer method of measuring a fugitive emission rate that involves release of a reference gas that is of a different composition than the subject gas; measurement of concentrations of both the subject gas and the tracer gas; integrating separately for the subject gas and the reference gas the concentration data along the horizontal; and computing the ratio of the integrated concentrations with the reference gas as the denominator and the subject gas in the numerator, and then multiplying this ratio by the reference gas discharge rate to obtain a fugitive emission rate measurement of the subject gas. This method measures fugitive emission rates by horizontally integrated concentrations and provides a determination of the fugitive emission rate and not a calibration of the fugitive emission rate.

Scharff et. al. (2003) discuss the calibration of measured fugitive emission rates using an inverse modelling technique involving the release and measurement of a standard that is different from the gas emitted by the source of interest. Scharff et al. do not, however, indicate or suggest that there can be different levels of confidence in the calibration of a fugitive emission rate measurement. Releasing a reference gas into an emission plume and measuring it does not necessarily mean that there is high confidence in the calibration. For example, if a subject gas emission plume extends from a ground surface to a height that is much higher than the reference gas plume, the reference gas plume occupies only the lower heights, and the wind velocity versus height relationship is assumed rather than measured. With such a situation, the comparison of the measured fugitive emission rate to the reference gas is only in the lower portion of the subject gas plume and not the middle or upper portions of the subject gas emission plume. The calibration of the subject gas emission rate is, thus, effectively only for the lower portion of the plume and not the entire plume.

This background information is provided for the purpose of making known information believed by the applicant to be of possible relevance to the present invention. No admission is necessarily intended, nor should be construed, that any of the preceding information constitutes prior art against the present invention.

SUMMARY

The present disclosure is directed at methods for calibrating a fugitive emission rate measurement.

According to the present disclosure, there is provided a method (A) for calibrating a fugitive emission rate measurement of a subject gas from an emission source comprising,
  (a) discharging a reference gas at a measured discharge rate from a reference gas source located within, or near to, the emission source, the reference gas having a composition the same as, or similar to that of, the subject gas;
  (b) measuring a combined fugitive emission rate of the subject gas and the reference gas using a selected method of fugitive emission rate measurement;
  (c) turning off the reference gas source and measuring a fugitive emission rate of the subject gas using the selected method; and
  (d) calibrating the fugitive emission rate measurement of the subject gas from the emission source to obtain a calibrated measurement.

Furthermore, the method as described above (A) may comprise, prior to the step of calibrating (step d), calculating a deviation, or one or more than one adjusted parameter, of the measured combined fugitive emission rate minus the fugitive emission rate of the subject gas from the discharge rate of the reference gas. The step of calibration, step (d), of method (A), may comprise calibrating the fugitive emission rate measurement of the subject gas from the emission source using the deviation, or the adjusted parameter, to obtain a calibrated measurement. Also included, is a method as described above (A) wherein the step of turning off (step c) is performed prior to the step of discharging (step a). Furthermore, the method may further comprise a step (e) of evaluating the quality of the calibrated measurement using a correlation approach or an integral approach. In the step of measuring (step b) and the step of turning off (step c), a satellite may be used in the selected method of fugitive emission rate measurement.

The present invention further includes a computer readable memory having recorded thereon statements and instructions for execution by a computer to carry out the method (A) as described above.

The present invention also provides a method (B) for determining a quality of a calibrated fugitive emission rate measurement of a subject gas from an emission source comprising,
  (a) discharging a reference gas at a measured discharge rate from a reference gas source located within, or near to, the emission source, the reference gas having a different composition to that of the subject gas;

(b) measuring a fugitive emission rate of the subject gas and a fugitive emission rate of the reference gas using a selected method of fugitive emission rate measurement;

(c) calibrating the fugitive emission rate measurement of the subject gas from the emission source to obtain a calibrated measurement; and (d) evaluating a quality of the calibrated measurement by using a correlation approach or an integral approach.

Furthermore, the method as described above (B) may comprise, prior to the step of calibrating (step c), calculating a deviation, or one or more than one adjusted parameter, of the measured fugitive emission rate of the reference gas from that of the discharge rate of the reference gas. The step of calibration, step (c), of method (B) may comprise calibrating the fugitive emission rate measurement of the subject gas from the emission source using the deviation, or the one or more than one adjusted parameter, to obtain a calibrated measurement. Also included, is a method as described above (B), wherein in the step of measuring (step b), the selected method of fugitive emission rate measurement is a mass balance approach. Additionally, in the step of measuring (step b), the selected method of fugitive emission rate measurement may involve obtaining one or more than one concentration or integrated concentration measurement wholly or partly between 15 m and 150 m above a ground surface.

The present invention further includes a computer readable memory having recorded thereon statements and instructions for execution by a computer to carry out the method (B) as described above.

The present invention also provides the method (A) or the method (B) as described above wherein in the step of evaluating (step e for method (A) and step d for method (B)), the quality of the calibrated measurement is obtained using the integral approach comprising either:

(A)
(a) plotting a graph of a normalized mass per unit area versus a height, or normalized height, for the subject gas to obtain a normalized subject gas graph, and plotting a graph of a normalized mass per unit area versus a height, or normalized height, for the reference gas to obtain a reference gas graph; and (b) comparing an intersecting area common to both the normalized subject gas graph and the reference gas graph, with the total area under either the normalized subject gas graph or the reference gas graph, wherein an overlap of from about 20-100%, of the intersecting area common to both graphs is an indication of a suitable quality of the calibrated measurement; or (B)
(i) plotting a graph of a normalized mass per length-time area versus the height, or normalized height, for the subject gas to obtain a normalized subject gas graph, and plotting a graph of a normalized mass per length-time area versus the height, or normalized height, for the reference gas to obtain a reference gas graph; and (ii) the normalized subject gas graph and the reference gas graph, with the total area under either the normalized subject gas graph or the reference gas graph, wherein an overlap of from about 20-100%, of the intersecting area common to both graphs is an indication of a suitable quality of the calibrated measurement.

The present disclosure also provides a method (C) of measuring a fugitive emission rate of a subject gas from an emission source comprising, (a) discharging a reference gas at a measured discharge rate from a reference gas source located within, or near to, the emission source, the reference gas having a different composition to that of the subject gas;

(b) measuring concentrations or integrated concentrations of the subject gas in a two dimensional vertical surface within a subject gas emission plume to obtain a two-dimensional integrated mass per unit length (or mass) of the subject gas emission plume; and measuring concentrations or integrated concentrations of the reference gas in a two dimensional vertical surface within a reference gas emission plume to obtain a two-dimensional integrated mass per unit length (or mass) of the reference gas emission plume; and (c) calculating the fugitive emission rate of the subject gas by dividing the two-dimensional integrated mass per unit length (or mass) of the subject gas emission plume by the two-dimensional integrated mass per unit length (or mass) of the reference gas emission plume, to obtain a quotient, and multiplying the quotient by the measured discharge rate from the reference gas source.

Also included, is a method as described above (C), wherein the step of calculating (step c), further comprises a step of applying a wind profile factor to the calculated fugitive emission rate of the subject gas. Furthermore, the method (C) described above may comprise a step (d) of evaluating a quality of the calculated fugitive emission rate of the subject gas using an integral approach comprising:

(i) plotting a graph of a normalized mass per unit area versus a height, or normalized height, for the subject gas to obtain a normalized subject gas graph, and plotting a graph of a normalized mass per unit area versus a height, or normalized height, for the reference gas to obtain a reference gas graph; and (ii) comparing an intersecting area common to both the normalized subject gas graph and the reference gas graph, with the total area under either the normalized subject gas graph or the reference gas graph, wherein an overlap of from about 20-100%, of the intersecting area common to both graphs is an indication of a suitable quality of the calculated fugitive emission rate of the subject gas.

Also included, is a method as described above (C), wherein the fugitive emission rate of the subject gas is calibrated, the calibration comprising, (d) measuring the fugitive emission rate of the subject gas using another selected method of fugitive emission rate measurement to produce a second calculated fugitive emission rate of the subject gas; and (e) comparing the second calculated fugitive emission rate of the subject gas with the calculated fugitive emission rate of the subject gas from the emission source to obtain a calibrated measurement.

The present invention further includes a computer readable memory having recorded thereon statements and instructions for execution by a computer to carry out the method (C) as described above.

The present invention further includes a computer readable memory having recorded thereon statements and instructions for execution by a computer to carry out the method (C) as described above including the calibration of the fugitive emission rate measurement of the subject gas.

According to the present disclosure, there is also provided a method (D) for determining quality of a fugitive emission rate measurement of a subject gas from an emission source comprising, (a) discharging a reference gas at a measured discharge rate from a reference gas source located within, or near to, the emission source, the reference gas having a composition the same as, or similar to that of, the subject gas;

(b) measuring a combined fugitive emission rate of the subject gas and the reference gas using a selected method of fugitive emission rate measurement;

(c) turning off the reference gas source and measuring the fugitive emission rate of the subject gas using the selected method; and (d) calculating a deviation of the measured combined fugitive emission rate and the fugitive emission rate of the subject gas from the discharge rate of the reference gas, a percent deviation greater than between about −67% and 200% is indicative of a low quality fugitive emission rate measurement.

The present invention further includes a computer readable memory having recorded thereon statements and instructions for execution by a computer to carry out the method (D) as described above.

Furthermore, the methods as described above (methods A, B and C) may comprise a method of calibration wherein one or more than one assumed parametric value of a fugitive emission rate measurement of a subject gas is adjusted to produce the adjusted parameter, such that the percent deviation is less than or equal to a target accuracy value. The target accuracy value may be less than or equal to about 15%.

There are several known methods for measuring fugitive emission rates of a subject gas from an emission source, however, the accuracy of such methods are unknown. Consequently, there has been a general lack in confidence in the accuracy of fugitive emission rate measurements.

By using the methods as described above, measurement of the fugitive emission rate of a gas or gases from a source of interest (subject gas) may be calibrated thereby increasing confidence in, and removing uncertainties pertaining to, the accuracy of the methodologies used. The methods described herein are well suited to calibrate emission sources that cover a large area thereby increasing accuracy and confidence in these methods, when compared with the accuracy and confidence in prior art methods.

BRIEF DESCRIPTION OF THE DRAWINGS

These and other features of the invention will become more apparent in the following detailed description in which reference is made to the appended drawings.

FIG. 6 is a graph showing the results of a calibration of a method that measures integrated concentrations with vertical or near vertical measurement beams. Subject gas: solid line; reference gas: dashed line.

DETAILED DESCRIPTION

Figure 1:
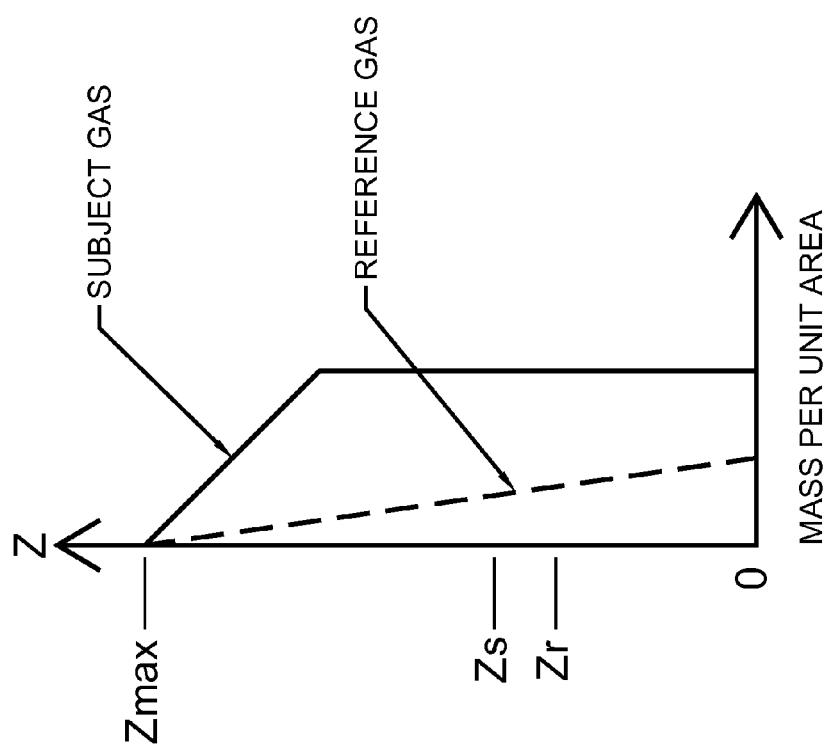
FIG. 1 shows a graph of the center of mass of a subject gas plume and reference gas plume with respect to height Z. Zs: is the height of the centre of mass per unit length of the subject gas plume; Zr: is the height of the centre of mass per unit length of the reference gas plume.

The present disclosure relates generally to methods for calibrating fugitive emission rate measurements of a subject gas emitted from an emission source.

The present disclosure relates to the accurate measurement of an emission rate of a subject gas from an emission source of interest and methods for calibrating such measurements to obtain an accurate fugitive emission rate measurement of the subject gas from the emission source. An increased confidence in the accuracy of a fugitive emission rate measurement can result from calibrating the fugitive emission rate measurement of a subject gas from a source of interest.

Different methods may be used for carrying out the present invention. In accordance with one aspect of the present invention, a method for calibrating a fugitive emission rate of a subject gas is provided that uses a reference gas comprising the same composition as, or a composition similar to that of, the subject gas (hereinafter referred to as, the "Same Gas Method"). In another aspect of the present invention, a method for calibrating a fugitive emission rate of a subject gas is provided that uses a reference gas comprising a different composition than the subject gas (hereinafter referred to as, the "Different Gas Method"). In accordance with yet another aspect of the present invention, a method for calibrating a fugitive emission rate of a subject gas is provided that uses a modified 2-D tracer method emission rate measurement as a reference for the fugitive emission rate measurement of the subject gas.

In the present disclosure, the term "subject gas" refers to a gas or gases that are emitted from an emission source of interest and comprise the emission plume. Emission sources may include, but are not limited to a landfill site, a tailings pond, a mine, a pipeline leak or an industrial facility, for which a fugitive emission rate may be measured and calibrated.

In the present disclosure, the term "reference gas," refers to one or more than one gas that may be released at a site as described herein. The reference gas may be the same or different, as the subject gas The reference gas may be imported to a site and contained in one or more compressed gas tanks or liquefied gas tanks. Alternatively, as used herein, "reference gas" may be a gas formed as a result of a chemical reaction, industrial process or combustion, or a gas drawn from a pipeline or other source. In some situations, the "reference gas" may be obtained from a site, for example, by processing gas from an emission source of interest. In addition, the "reference gas" of the present invention may be of a composition that has been accurately determined prior to discharge to the atmosphere. "Reference gas" is also described herein as a "standard" and "reference gas" and "standard" have the same meaning herein and can be used interchangeably.

In the present disclosure, by the term "calibrate," "calibrating" or "calibration," it is meant a process which allows a fugitive emission rate measurement of a subject gas to be related quantitatively to an accurately measured discharge rate of a reference gas, or another method of fugitive emission rate measurement. This may involve identification of the magnitude of deviation with respect to a reference (such as the measured discharge rate of a reference gas) and/or correcting the fugitive emission rate measurement value of the subject gas with respect to the reference to obtain a corrected, and more accurate, subject gas measurement. For example, an emission rate measurement of a subject gas may be calibrated by comparing the fugitive emission rate measurement of the subject gas with a reference measurement using the methods as described herein to obtain a deviation between the two measurements and thereafter adjusting (correcting) the measurement of the subject gas using the deviation to obtain a corrected, and more accurate, subject gas measurement. This calibration process may also involve adjustment of one or more than one assumed fugitive emission rate measurement method parametric values (i.e. an adjusted parameter) such that the deviation is within a certain target range. Accordingly, the terms "correct," "correcting" and "correction" may be used synonymously with the terms "calibrate," "calibrating" and "calibration" herein.

By the term "fugitive emission," it is meant releases into the atmosphere of airborne matter from an emission source (such as the subject gas), whether it is from a diffuse source or from a point source, and where the airborne matter may be greenhouse gases, gaseous organic compounds, polluting gases or particulate matter.

In the present disclosure, by the term "discharge," it is meant a measured release of a reference gas to the atmosphere, such measurement occurring before release of the reference gas to the atmosphere.

In the present disclosure, by the term "emission," it is meant the release of a subject gas by an emission source of interest, the release of a reference gas, or both, to the atmosphere.

As used herein, the term "emission source," "emission source of interest," "source of interest" or "source" refers to the emission point or area or surface from which the subject gas enters the atmosphere.

In the present disclosure, by the term "plume," it is meant the atmospheric volume within which an airborne matter, such as the subject gas or the reference gas, exists.

As used herein, the term "fugitive emission rate" refers to the emission rate or the flow rate of an airborne matter, such as the subject gas or the reference gas, from the source of interest. Measurement of a fugitive emission rate occurs after the release of an airborne matter, such as the subject gas or the reference gas, to the atmosphere.

In the present disclosure, "fugitive emission rate measurement method" and "fugitive emission flow measurement method" refers to a method used for calculating or measuring the fugitive emission rate of an airborne matter, such as the subject gas or the reference gas. "Fugitive emission rate measurement method" and "fugitive emission flow measurement method" are the same and can be used interchangeably.

By the term "quality of calibration," "quality of the calibration" or "quality of the calibrated measurement," it is meant the degree of confidence that can be placed on a calibration of the fugitive emission rate measurement and, therefore, the calibrated fugitive emission rate measurement of the subject gas. The quality of the calibration of the fugitive emission rate measurement of the subject gas refers to a degree of matching a parameter (for example, but not limited to, a normalized mass per unit area or a normalized mass per unit length-time) for each common wind velocity or height between a subject gas plume and a reference gas plume. The quality of calibration may be determined by overlaying a graph of a parameter versus common wind velocity or height of a subject gas emission plume and a graph of the same parameter versus common wind velocity or height of a reference gas emission plume and comparing the amount of overlap between the area of the graph of the subject gas plume and the area of the graph of the reference gas plume. In the case where there is no intersecting area common to a subject gas graph and a reference gas graph, then the quality of calibration is zero. A "perfect" calibration of the fugitive emission rate measurement of a subject gas, exists where the two graphs intersect completely (i.e., 100 percent intersecting area common between the two graphs). For example, an indication of a suitable quality of calibration may be when the intersecting area common to both graphs is from about 20-100%, or any amount therebetween, or when the intersecting area common to both graphs is, for example, about 20, 30, 40, 50, 60, 70, 80, 90, 100%, or any amount therebetween (see, for example, FIG. 4 and supporting text). The quality of calibration increases with a corresponding increase in the intersecting area common to both graphs.

In the present disclosure, by the term "selected method" or "selected method of fugitive emission rate measurement," it is meant any method that is selected for measuring the fugitive emission rate of an airborne matter, such as the subject gas or the reference gas. The "selected method" may be any method that can provide a fugitive emission rate by obtaining concentration or integrated concentration data within an emission plume and obtaining wind velocity data to derive a fugitive emission rate measurement. For example, without limitation, the method may be Radial Plume Mapping (USEPA, 2006), solar occultation flux (Mellqvist et. al, 2005), differential absorption LiDAR (Chambers et. al 2008), conventional mass balance (Milly 1964 & 1979, Desjardins et. al. 2004, Mays 2009), Airborne Matter Mapping (Wong 2011 and Wong 2012), Total Plume (Wong, 2010), MAMAP (Gerilowski et. al., 2011), inverse modelling. Satellites may also be used for an emission rate measurement.

Same Gas Method.

In accordance with an aspect of the present invention, there is provided a method for calibrating a fugitive emission rate of a subject gas that uses a reference gas comprising the same composition as, or a composition similar to that of, the subject gas (Same Gas Method). The Same Gas Method may be useful when only one type of gas can be measured using a concentration or integrated concentration measurement device, or when the subject gas emission rate is within approximately 20% to 500%, or any amount therebetween, of the reference gas discharge rate, for example, but not limited to, within approximately 30, 40, 50, 60, 70, 80, 90, 100, 125, 150, 175, 200, 225, 250, 275, 300, 325, 350, 375, 400, 425, 450, 475, 500%, or any amount therebetween, of the reference gas discharge rate. The subject gas emission rate may be constant or substantially constant over the measurement period. However, the Same Gas Method may also be used if the subject gas emission rate varies over a measurement period. With the Same Gas Method, only one concentration or integrated concentration device is required, since the subject gas and the reference gas are identical or substantially of the same composition. This method may also be useful when the Different Gas Method, as described below, cannot be used and the fugitive emission measurement rate method has reasonable precision.

The concentration or integrated concentration measurement device used with the Same Gas Method may include devices that can measure multiple gases, but these gases may not be useful for calibration purposes. For example if the subject gas is methane, and the concentration or integrated concentration measurement device can also measure both methane and oxygen, then that device is considered to be a device that can measure only one type of gas because the measurement of oxygen is not useful for the purpose of calibration of the subject gas emission rate measurement.

For the Same Gas Method, the following non-limiting, exemplary fugitive emission rate measurement or fugitive emission flow measurement methods or techniques may be applied, all of which are considered to be a mass balance approach: Radial Plume Mapping (USEPA, 2006), solar occultation flux (Mellqvist et. al, 2005), differential absorption LiDAR (Chambers et. al 2008), conventional mass balance (Milly 1964 & 1979, Desjardins et. al. 2004, Mays 2009), Airborne Matter Mapping (Wong 2011 and Wong 2012), Total Plume (Wong, 2010), and MAMAP (Gerilowski et. al., 2011). Satellites may also be used for the emission rate measurements in a manner similar to MAMAP, solar occultation flux, or Total Plume methods. All of these fugitive emission rate measurement or fugitive emission flow measurement methods or techniques have the common characteristics of obtaining concentration or integrated concentration data within the subject gas emission plume and obtaining wind velocity data to derive a fugitive emission flow rate. In addition to the above examples, other methods or techniques for measuring fugitive emission rates or fugitive emission flow measurements may also be used as would be evident to one of skill in the art.

Inverse modelling (for example, Piccot et. al, 1994; Flesch et. al 1995; and Wong et. al. 2010) may also be applied, provided the plume is adequately sampled. However, such modelling is often associated with poor plume measurement coverage (i.e. the concentration or integrated concentration measurements typically sample only a very limited portion of the plume, and modelling is used to extrapolate where concentration measurements are not available). Caution is, therefore, applied when calibrating inverse modelling results using the methods described herein.

For a given site with fugitive emissions of a subject gas, this Same Gas Method for calibrating a fugitive emission rate measurement of the subject gas comprises the steps of:
(a) discharging a reference gas (R) of the same composition as, or of a composition similar to that of, the subject gas at a measured rate from a reference gas source to the atmosphere, with the discharge rate preferably at a relatively constant rate;
(b) while discharging the reference gas (R) from the reference gas source, measuring, using a selected method of fugitive emission rate measurement, the fugitive emission rate of the combined plume (C) in the atmosphere, the combined plume (C) comprising both the plume of the subject gas (S) and the plume of the reference gas (R);
(c) turning off the reference gas source and measuring the fugitive emission rate of the subject gas from the emission source of interest only (S) using the same selected method of fugitive emission rate measurement as used in step (b) above. The plume in this step (c) would consist of only the subject gas, and not the reference gas; and
(d) calibrating the fugitive emission rate measurement of the subject gas from the emission source to obtain a calibrated measurement.

Alternatively, for a given site with fugitive emissions of a subject gas, this Same Gas Method for calibrating a fugitive emission rate measurement of the subject gas may comprise the steps of:
(a) discharging a reference gas (R) of the same composition as, or of a composition similar to that of, the subject gas at a measured rate from a reference gas source to the atmosphere, with the discharge rate preferably at a relatively constant rate;
(b) while discharging the reference gas (R) from the reference gas source, measuring, using a selected method of fugitive emission rate measurement, the fugitive emission rate of the combined plume (C) in the atmosphere, the combined plume (C) comprising both the plume of the subject gas (S) and the plume of the reference gas (R);
(c) turning off the reference gas source and measuring the fugitive emission rate of the subject gas from the emission source of interest only (S) using the same selected method of fugitive emission rate measurement as used in step (b) above. The plume in this step (c) would consist of only the subject gas, and not the reference gas;
(d) calculating a deviation of the measured combined fugitive emission rate and the fugitive emission rate of the subject gas from the discharge rate of the reference gas; and
(e) calibrating the fugitive emission rate measurement of the subject gas from the emission source using the deviation of step (d) to obtain a calibrated measurement.

The order of the above steps of execution for both of the methods described above may be modified. For example, step (c) may be performed either before both steps (a) and (b), or after both steps (a) and (b). The method for calibrating a fugitive emission rate measurement may, therefore, comprise the measurement of the fugitive emission rate of the subject gas prior to discharge of the reference gas and then measurement of the fugitive emission rate of the combined plume. Alternatively, the method may comprise discharge of the reference gas measurement of the fugitive emission rate of the combined plume prior to measurement of the fugitive emission rate of the subject.

If step (c) is performed after steps (a) and (b) are complete (i.e., after completion of the measurement of the fugitive emission rate of the combined plume), then step (c) requires the step of shutting of the reference gas source and waiting an adequate amount of time for the reference gas to dissipate and be removed by the wind. Once the reference gas has been sufficiently removed from the atmospheric volume of measurement by the wind, then the fugitive emission rate of the subject gas from the emission source of interest (S) may be measured. Waiting until the reference gas is sufficiently dissipated ensures that the plume consists of only the subject gas, and not the reference gas.

If step (c) is performed before steps (a) and (b), then the fugitive emission rate of the subject gas from the emission source of interest is measured first. The plume would, therefore, consist of only the subject gas, and not the reference gas. Once the measurement of the fugitive emission rate of the subject gas is complete, then the reference gas is discharged at an accurately measured rate to the atmosphere and the fugitive emission rate of the combined plume is measured. When the measurement of the fugitive emission rate of the combined plume is complete, the reference gas source is shut-off.

With reference to both of the methods described above, an additional step (e) or (f), as appropriate, of evaluating a quality of the calibrated measurement may be performed as described below, for example, but not limited to, by using a correlation approach or an integral approach.

Set-Up:

The Same Gas Method described above may also comprise a set-up procedure before steps (a)-(d) or (a)-(e). Set-up may include a facility to accurately measure the discharge rate that the reference gas is released to the atmosphere. The measurement facility, which would be upstream of the discharge point to the atmosphere, may also include piping and/or hoses, a flow meter, and pressure and temperature gauges, and may include a weigh scale. The set-up also includes a discharge point of the reference gas to the atmosphere. A diffuser may also be used to assist with dispersing the reference gas into the plume of the subject gas or gases of interest, but such a diffuser is not necessary.

Therefore, the set-up prior to steps (a)-(d) or (a)-(e) described above may comprise the following steps:
  (i) obtaining and setting-up a reference gas source for discharging the reference gas, which is of the same or substantially the same composition as the subject gas; and
  (ii) selecting a method for measuring the fugitive emission rates of the subject gas, the reference gas, and a combination of the subject gas and the reference gas, and setting up the required equipment for such a method at the site. The selected method may also include measurement of the wind velocity.

In step (i) of this set-up procedure, the discharge point of the reference gas may be located within or near the emission source of the subject gas. By the term "near," it is meant a location that has a similar wind field as the subject gas plume. Preferably, the reference gas source and, thus, the discharge point of the reference gas is located such that the subject gas plume and reference gas plume mix to form a combined plume.

Steps (i) and (ii) of the above-set up procedure may be completed in either order; that is, step (i) before step (ii) or step (i) after step (ii).

Calculation:

The calculation step of the method (i.e., step (d), as described above) and the results of such calculation may be presented in different ways.

For example, the percent deviation of the selected method of measuring the fugitive emission rate of the subject gas can be calculated as:

$$\% \text{ deviation} = \frac{(C - S - R)}{R} \times 100\%$$

This percent deviation is an indicator of the quality of the measurement of the fugitive emission rate of the subject gas with respect to the reference gas. A higher absolute value percent deviation may be indicative of a less reliable measurement and, thus, lower confidence in the accuracy of a fugitive emission rate measurement of the subject gas. A lower absolute value percent deviation would be indicative of a more reliable measurement and, thus, higher confidence in the accuracy of a fugitive emission rate measurement. For example, without limitation, an absolute value percent deviation of greater than between about −67% and 200% is an indication of an unusable fugitive emission rate measurement of the subject gas. An absolute value percent deviation of between about −67% and about 200%, or any amount therebetween, is therefore an indication of a useable rate measurement; for example, about −67, −60, −50, −40, −30, −25, −20, −10, −5, 0, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200% deviation, or any amount therebetween, would be an indication of a useable rate measurement.

The value of the measured fugitive emission rate of the subject gas or gases of interest can then be calibrated (corrected) as follows:

$$\text{Calibrated (corrected) fugitive emission rate} = S \times \left[\frac{R}{(C - S)}\right]$$

$$= S \times \left[\frac{1}{\frac{(\% \text{ deviation})}{100\%} + 1}\right]$$

Another method of calibration (the "adjusted parameters" method) may be used to calibrate (correct) the measured fugitive emission rate of the subject gas or gases of interest. This adjusted parameters method of calibration involves the adjusting of one or more assumed parametric values of the fugitive emission rate measurement. The assumed parametric value depends upon the method used for measuring the fugitive emission rate of the subject gas, as would be known to one of skill in the art. Parameters or parametric values may include, for example but not limited to, wind profile relationships, gridding anisotropy, gridding method, stability class, zero plane displacement, Obukhov length, diabatic correction term, absorption ratio, backscatter coefficient, or solar radiation. One or more assumed parameters or parametric values of the fugitive emission rate measurement of the subject gas may be adjusted such that the % deviation is less than or equal to a target accuracy value. A target accuracy value of less than or equal to about 15% is preferred, however, the target accuracy may also be 0, 1, 1.5, 2, 2.5, 3, 3.5, 4, 4.5, 5, 6, 7, 8, 9, 10, 11, 12, 13, 14, 15%, or any value therebetween. For example, if a logarithmic wind profile is assumed with an assumed roughness length (for example, of the ground vegetation) of 0.5 m, this roughness length value could be adjusted until the % deviation is less than or equal to the target accuracy value. This adjustment may result in a roughness length value of, for example, 1.0. Another example is to adjust the gridding anisotropy value of a contouring program for the Airborne Matter Mapping (AMM) method until the percent deviation is less than or equal to the target accuracy value. Both the roughness length and the gridding anisotropy values (or any other assumed parametric values) may be adjusted simultaneously until the % deviation is less than or equal to the target accuracy value, such as about 15%. The set of assumed values that are most reasonable to adjust with respect to actual conditions may also be selected.

Variations to the above methods of calculating the percent deviation and thereby obtaining a calibrated fugitive emission rate measurement, of which a person skilled in the art would be able to derive, are within the scope of this invention.

The quality of the calibration (i.e., the quality of the calibrated measurement) may also be evaluated by one of a number of methods, as discussed below.

Different Gas Method.

In accordance with another aspect of the present invention, there is provided a method for calibrating a fugitive emission rate of a subject gas that uses a reference gas comprising a different composition than the subject gas. This Different Gas Method may be used in most situations. This method requires either two different concentration or integrated concentration measurement devices, or a concentration or integrated concentration measurement device that (at a minimum) can measure both the subject gas and the reference gas.

For the Different Gas procedure, the following exemplary fugitive emission rate measurement or fugitive emission flow measurement methods or techniques, all of which are considered to be a mass balance approach: Radial Plume Mapping (USEPA, 2006), differential absorption LiDAR (Chambers et. al 2008), conventional mass balance (Milly 1964 & 1979, Desjardins et. al. 2004, Mays 2009), and Airborne Matter Mapping (Wong 2011 and Wong 2012). All of these fugitive emission rate measurement or fugitive emission flow measurement methods or techniques have the common characteristics of obtaining concentration or horizontally-integrated concentration data within the subject gas emission plume and obtaining wind velocity data to derive a fugitive emission rate. In addition to the above examples, other methods or techniques for measuring fugitive emission rates or fugitive emission flow measurements may be used.

As with the Same Gas Method, inverse modelling (Piccot et. al 1994, Flesch et. al 1995, Wong et. al. 2010) may also be applied with the Different Gas Method, provided the plume is adequately sampled. However, such modelling is often associated with poor plume measurement coverage and, thus, caution is applied when calibrating inverse modelling results using the methods described herein.

For a given site with fugitive emissions of a subject gas, this Different Gas Method for calibrating a fugitive emission rate measurement of the subject gas comprises the steps of:
  (a) discharging a reference gas (R) of a different composition than the subject gas at a measured rate from a reference gas source to the atmosphere, with the discharge rate preferably at a relatively constant rate;
  (b) while discharging the reference gas (R) from the reference gas source and after a steady-state plume of the reference gas has formed, measuring the fugitive emission rate of each of the subject gas (S) and of the reference gas in the plume (P) using a selected method of fugitive emission rate measurement. These measurements are preferably done simultaneously or substantially simultaneously;
  (c) calibrating the fugitive emission rate measurement of the subject gas from the emission source to obtain a calibrated measurement; and
  (d) evaluating a quality of the calibrated measurement by using a correlation approach or an integral approach.

Alternatively, for a given site with fugitive emissions of a subject gas, this Different Gas Method for calibrating a fugitive emission rate measurement of the subject gas may comprise the steps of:
  (a) discharging a reference gas (R) of a different composition than the subject gas at a measured rate from a reference gas source to the atmosphere, with the discharge rate preferably at a relatively constant rate;
  (b) while discharging the reference gas (R) from the reference gas source and after a steady-state plume of the reference gas has formed, measuring the fugitive emission rate of each of the subject gas (S) and of the reference gas in the plume (P) using a selected method of fugitive emission rate measurement. These measurements are preferably done simultaneously or substantially simultaneously;
  (c) calculating a deviation of the measured emission rate of the reference gas from that of the discharge rate of the reference gas;
  (d) calibrating the fugitive emission rate measurement of the subject gas from the emission source using the deviation to obtain a calibrated measurement; and
  (e) evaluating the quality of the calibrated measurement by using a correlation approach or an integral approach.

Set-Up:

The Different Gas Methods described above may also comprise a set-up procedure before steps (a)-(d) or (a)-(e). As with the Same Gas Method, set-up of the Different Gas Method may include a facility to accurately measure the discharge rate that the reference gas is released to the atmosphere. The measurement facility, which would be upstream of the discharge point to the atmosphere, may also include piping and/or hoses, a flow meter, and pressure and temperature gauges, and may include a weigh scale. The set-up also includes a discharge point of the reference gas to the atmosphere. A diffuser may also be used to assist with dispersing the reference gas into the plume of the subject gas or gases of interest, but such a diffuser is not necessary.

Therefore, the set-up procedure prior to steps (a)-(d) or (a)-(e) described above may comprise the following steps:
  (i) obtaining and setting-up a reference gas source for discharging the reference gas, which is of a different composition than the subject gas; and
  (ii) selecting a method for measuring the fugitive emission rates of the subject gas and the reference gas, and setting up the required equipment for such a method at the site. The selected method may also include measurement of the wind velocity.

In step (i) of this set-up procedure, the discharge point of the reference gas may be located within or near the emission source of the subject gas. By the term "near," it is meant a location that has a similar wind field as the subject gas plume. Preferably, the reference gas source and, thus, the discharge point of the reference gas is located such that the subject gas plume and reference gas plume mix to form a combined plume.

Steps (i) and (ii) of the above-set up procedure may be completed in either order; that is, step (i) before step (ii) or step (i) after step (ii).

Calculation:

The calculating, calibrating and evaluating steps of the Different Gas Method (i.e., steps (c), (d) and (e), as described above) and the results of such calculation, calibration and evaluation may be presented in different ways.

In one embodiment, the percent deviation of the selected method of measuring the fugitive emission rate of the reference gas can be calculated as:

$$\% \text{ deviation} = \frac{(P-R)}{R} \times 100\%$$

As with the Same Gas Method, this percent deviation of the Different Gas Method is an indicator of the quality of the measurement of the fugitive emission rate of the reference gas, and therefore, the subject gas. A higher absolute value of the percent deviation would be indicative of a less reliable measurement and, thus, lower confidence in the accuracy of the measurement. A lower absolute value of the percent deviation would be an indication of a more reliable measurement and, thus, higher confidence in the accuracy of the fugitive emission rate measurement. For example, without limitation, an absolute value percent deviation of greater than between about −67% and 200% is an indication of an unusable fugitive emission rate measurement. An absolute value percent deviation of between about −67% and about 200%, or any amount therebetween, is therefore an indication of a useable rate measurement; for example, about −67, −60, −50, −40, −30, −25, −20, −10, −5, 0, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200% deviation, or any amount therebetween, would be an indication of a useable rate measurement.

The value of the measured fugitive emission rate of the subject gas or gases of interest can be calibrated (corrected) as follows:

$$\text{Calibrated (corrected) fugitive emission rate} = S \times \left[\frac{R}{P}\right]$$

$$= S \times \left[\frac{1}{\frac{(\% \text{ deviation})}{100\%} + 1}\right]$$

As with the Same Gas Method, another method of calibration (the "adjusted parameters" method) may be used to calibrate (correct) the measured fugitive emission rate of the subject gas or gases of interest. This adjusted parameters method of calibration involves the adjusting of one or more assumed parametric values of the fugitive emission rate measurement. The assumed parametric value depends upon the method used for measuring the fugitive emission rate of the subject gas, as would be known to one of skill in the art. Parameters or parametric values may include, for example but not limited to, wind profile relationships, gridding anisotropy, gridding method, stability class, zero plane displacement, or solar radiation. One or more assumed parameters or parametric values of the fugitive emission rate measurement of the subject gas may be adjusted such that the % deviation is less than or equal to a target accuracy value. A target accuracy value of less than or equal to 15% is preferred, however, the target accuracy may also be 0, 1, 1.5, 2, 2.5, 3, 3.5, 4, 4.5, 5, 6, 7, 8, 9, 10, 11, 12, 13, 14, 15%, or any value therebetween. For example, if a logarithmic wind profile is assumed with an assumed roughness length (for example, of the ground vegetation) of 0.5 m, this roughness length value could be adjusted until the % deviation is less than or equal to the target accuracy value. This adjustment may result in a roughness length value of, for example, 1.0. Another example is to adjust the gridding anisotropy value of a contouring program for the Airborne Matter Mapping (AMM) method until the percent deviation is less than or equal to the target accuracy value. Both the roughness length and the gridding anisotropy values (or any other assumed parametric values) may be adjusted simultaneously until the % deviation is less than or equal to the target accuracy value, such as about 15%. The set of assumed values that are most reasonable to adjust with respect to actual conditions may also be selected.

The quality of the calibrated fugitive emission rate may then be evaluated by one of a number of methods, as discussed below.

Variations to the above methods of calculating the percent deviation and thereby obtaining a calibrated fugitive emission rate measurement, of which a person skilled in the art would be able to derive, are within the scope of this invention.

One or more of the fugitive emission rate measurement methods may sample the entire cross-section of the reference gas plume and the subject gas plume, including, for example, at least one concentration or integrated concentration measurement between 15 m and 150 m above the ground surface, or any height therebetween; or between 30 m and 150 m above the ground surface, or any height therebetween; or between 45 m and 150 m above the ground surface, or any height therebetween, for plumes with a height greater than 15 m, 30 m, or 45 m, respectively. The at least one concentration or integrated concentration measurement may also be at, for example, 1, 2, 4, 6, 8, 10, 12, 14, 16, 18, 20, 22, 24, 26, 28, 32, 34, 36, 38, 40, 42, 44, 48, 50, 55, 60, 65, 70, 75, 80, 85, 90, 95, 100, 105, 110, 115, 120, 125, 130, 135, 140, 145, or any height therebetween above the ground surface.

It will be appreciated by one skilled in the art that the present method described herein differs from the tracer method described above by the step of measuring fugitive emission rates, rather than just horizontally integrated concentrations, and using these measurements to calibrate the fugitive emission rate method results. The tracer method provides a determination, not a calibration, of the fugitive emission rate. By comparison, the present method involves a determination of the fugitive emission rate of the subject gas, and a calibration of this measurement.

2-D Tracer Method Emission Rate Measurement

In accordance with another aspect of the present invention, there is provided a tracer method methodology that is modified to comprise the step of mapping the concentrations of both the subject gas and reference gas in a two-dimensional cross-section of the plumes. Alternatively, a conventional mass balance method could be used to obtain the totalized mass per unit area at different heights. In addition, Total Plume, solar occultation flux, MAMAP or similar methods could be used to obtain totalized mass per unit area at vertical or substantially vertical lines. The modified 2-D tracer method, or the alternative methods described above, can be applied as follows to obtain a fugitive emission rate measurement of the subject gas:

$$\text{2-D tracer method emission rate of subject gas} = S = R\omega \frac{\iint \sigma \, dy \, dz}{\iint \rho \, dy \, dz}$$

where R is the accurately-measured reference gas discharge rate, $\Omega$ is an optional wind profile factor, $\sigma$ (which is a function of y and z) is the concentration of the subject gas at coordinates y (horizontal direction across a plume) and z (vertical direction), and $\rho$ (which is a function of y and z) is the concentration of the reference gas in the vertical plane, a curved surface, or a curved surface or plane onto which concentration measurement points are projected in the wind direction. The benefit of the modified 2-D tracer method, as compared with a mass balance approach, is that wind speed data is not necessary and, in its simplest form, w can be set to a value of 1.0.

The wind profile factor ($\omega$) is a factor to account for different concentration patterns of the subject gas and reference gas and the effect of the wind profile on the mass flow rate of each plume. As a preferred embodiment, the effect of the variation of wind velocity with height (wind profile) can be incorporated into this modified 2-D tracer method by determining the height of the "center of mass per unit length" or "centre of flow" (depending on the parameter selected for analysis) for each of the subject gas and reference gas. For example, the center of mass per unit length of the subject gas plume can be determined by calculating the height at which $$\frac{1}{2}\int\int \sigma dy dz$$

occurs, as illustrated in FIG. 1. A similar analysis would be used for the reference gas plume, also as illustrated in FIG. 1. The log wind profile, wind profile power law, or other wind profile relationship may then be applied to determine the value of $\omega$. As a preferred embodiment, the log wind profile may be used to determine $\omega$:

$$\omega = \frac{\ln\left[\frac{(Zs-d)}{Zo}\right]}{\ln\left[\frac{(Zr-d)}{Zo}\right]}$$

where Zs is the height of the centre of mass per unit length or centre of flow of the subject gas plume, Zr is the height of the centre of mass per unit length or centre of flow of the reference gas plume, Zo is the roughness length (which can be evaluated using charts available in the existing art), and d is the zero plane displacement. Importantly, wind velocity is not required as an input to evaluate $\omega$ if the log wind profile relationship is used.

As an example to demonstrate the determination of the centre of mass per unit length, consider in FIG. 1 the reference gas mass per unit area having a triangular distribution with respect to height. In this example, Zr=[(2−√2)/2] Zmax, or Zr=0.2929 Zmax for the triangular area bounded by the two axes and the dashed line labelled "Reference Gas." At this value of Zr, half of the area of the reference gas triangle is above and half is below Zr.

The upper and lower integrals of the above equation can be adjusted for attenuation as described in Canadian Patent No. 2,715,677, filed on Oct. 5, 2010 and issued on Nov. 1, 2011.

The quality of the 2-D tracer emission rate measurement obtained using this modified 2-D tracer method can be evaluated using the methods as outlined below.

The 2-D tracer method can be extended to three dimensions (by sampling in three dimensions). However, it will be apparent to persons skilled in the art that this would essentially be similar to sampling in multiple two dimensional vertical planes.

Therefore, a method of measuring a fugitive emission rate of a subject gas from an emission source is provided herein. The methods comprises, (a) discharging a reference gas at a measured discharge rate from a reference gas source located within, or near to, the emission source, the reference gas having a different composition to that of the subject gas;

(b) measuring concentrations or integrated concentrations of the subject gas in a two dimensional vertical surface within a subject gas emission plume to obtain a two-dimensional integrated mass per unit length (or mass) of the subject gas emission plume; and measuring concentrations or integrated concentrations of the reference gas in a two dimensional vertical surface within a reference gas emission plume to obtain a two-dimensional integrated mass per unit length (or mass) of the reference gas emission plume; and (c) calculating the fugitive emission rate of the subject gas by dividing the two-dimensional integrated mass per unit length (or mass) of the subject gas emission plume by the two-dimensional integrated mass per unit length (or mass) of the reference gas emission plume, to obtain a quotient, and multiplying the quotient by the measured discharge rate from the reference gas source.

Furthermore, the fugitive emission rate measurement of the subject gas of the above method may be calibrated. The method to calibrate the fugitive emission rate measurement of the subject gas comprises:

(d) measuring the fugitive emission rate of the subject gas using another selected method of fugitive emission rate measurement to produce a second calculated fugitive emission rate of the subject gas; and (e) comparing the second calculated fugitive emission rate of the subject gas with the calculated fugitive emission rate of the subject gas from the emission source to obtain a calibrated measurement.

Evaluation of Quality of Calibration or of a 2-D Tracer Method Emission Rate Measurement The quality of calibration of a fugitive emission rate measurement or the quality of a 2-D tracer method emission rate measurement can be evaluated by comparing the distribution of the reference gas plume with that of the subject gas plume. A calibration in which a reference gas plume perfectly mixes with a subject gas plume is preferred as the respective concentrations of reference gas and subject gas are at a single ratio throughout the measured cross-section and it is not necessary to make assumptions regarding the wind velocity distribution. This calibration provides a high or suitable ("perfect") quality of calibration; however, such perfect mixing of plumes is rarely achieved.

Figure 2:
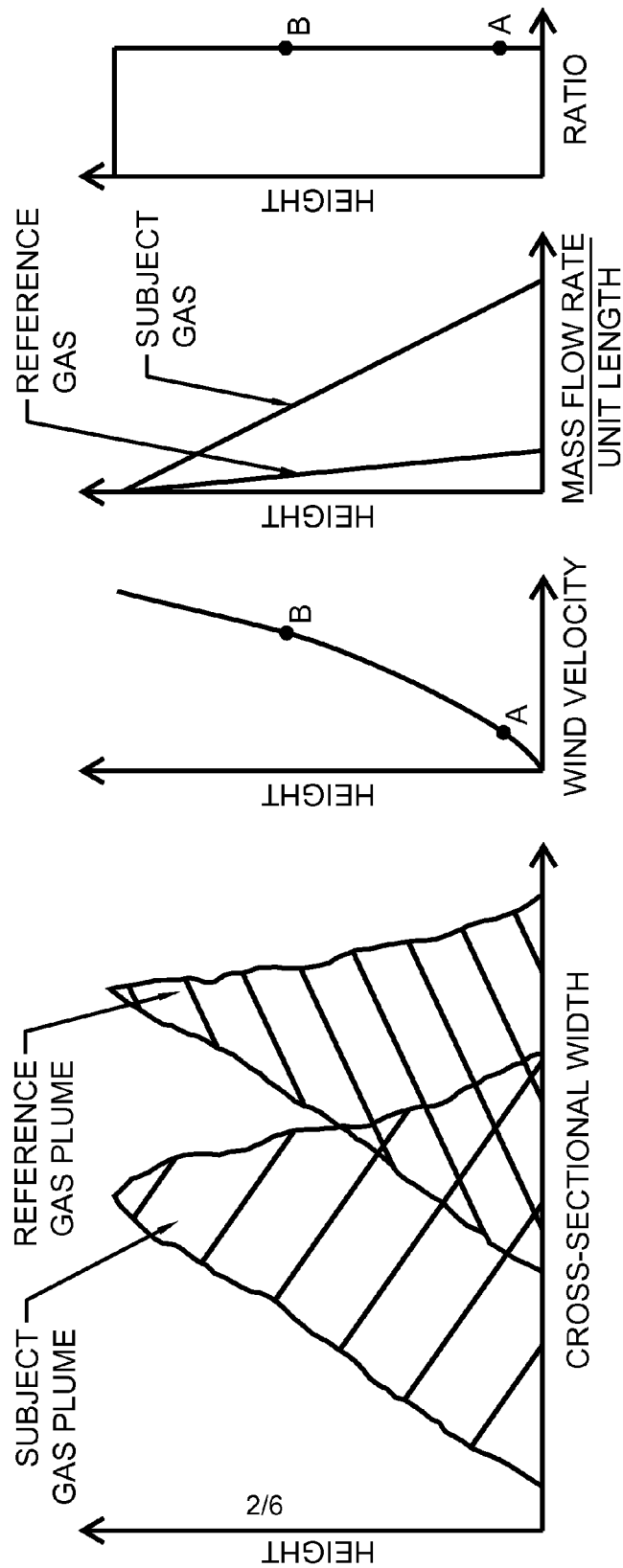
FIG. 2 shows an example of a suitable (also referred to as "perfect") quality calibration, assuming that the wind velocity variation with height is one dimensional. "Ratio": is the reference gas mass flow rate per unit length divided by the subject gas mass flow rate per unit length.

A suitable ("perfect") quality of calibration may also be a calibration in which the reference gas plume incompletely mixes with the subject gas plume, but the ratio of the mass flow rate within a cross-sectional "slice" for any given wind velocity remains the same between the reference gas and the subject gas. A simplified illustration of this is provided in FIG. 2. Although the plumes do not completely intersect, the quality of the calibration is suitable because the ratio of the mass flow rate of the reference gas and subject gas is the same for all horizontal cross-section wind velocities. For example, in FIG. 2 for a one dimensional variation of wind with height, the wind velocity at A applies to a cross-sectional slice across each plume at that height A, and the wind velocity at B applies to a cross-sectional slice across each plume at that height B, the ratio of the reference gas to the subject gas mass flow rate per unit length is the same. "Perfect," as used in this context, is meant that this is a theoretically perfect quality calibration, assuming one dimensional wind velocity variation with height.

By comparison, an irrelevant or poor quality calibration would be a reference gas plume that does not mix at all with the subject gas plume, and the reference gas plume is associated with a different wind field pattern than the subject gas plume. This does not indicate that the measured fugitive emission rate value is necessarily inaccurate; it only provides that the fugitive emission rate measurement value is not calibrated and the accuracy of the fugitive emission rate measurement is not determined.

Figure 3:
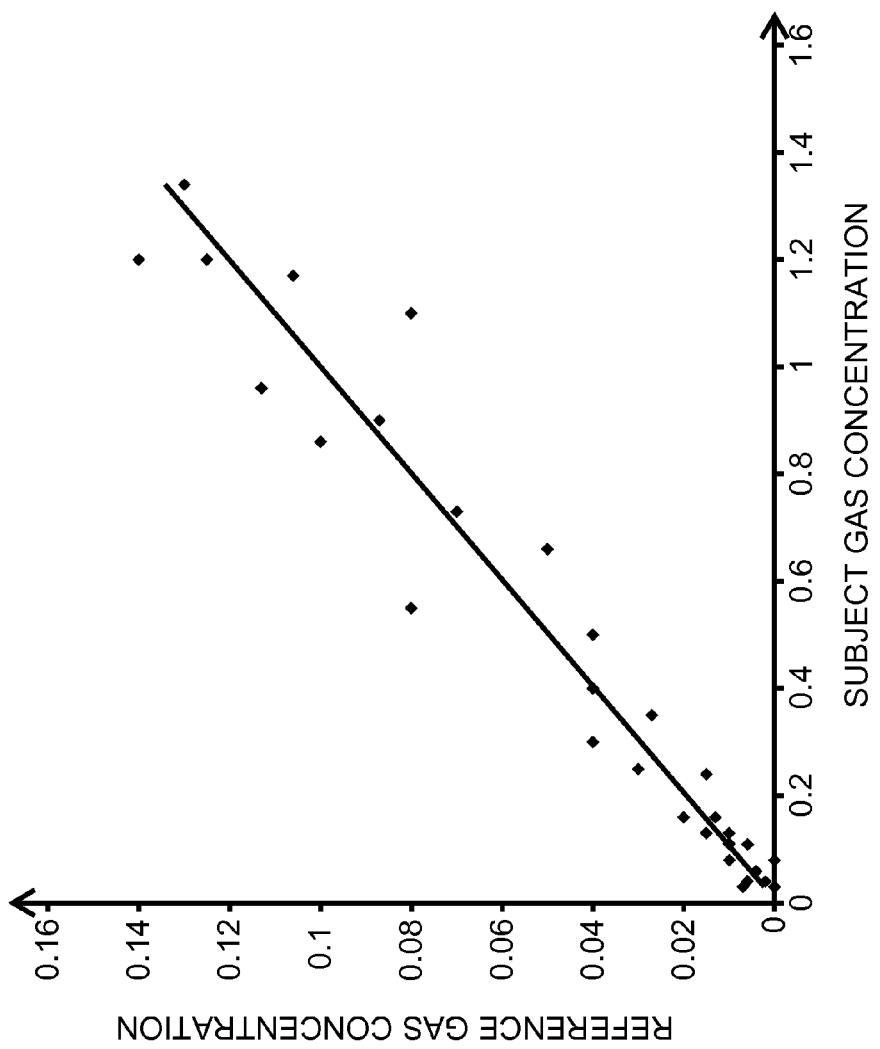
FIG. 3 is a graph showing the correlation approach for evaluating the quality of calibration and involves plotting, for each measured concentration measurement point or integrated concentration line, the subject gas concentration (or integrated concentration) along the X-axis versus the reference gas concentration (or integrated concentration) along the Y-axis and determining the coefficient of determination (R-squared).

There are different approaches for evaluating the quality of calibration. One approach, as shown in FIG. 3 and referred to as the correlation approach, is to plot, for each measured concentration measurement point or integrated concentration line, the subject gas concentration versus the reference gas concentration (or integrated concentration) and determine the coefficient of determination (R-squared). This also applies to the Same Gas Method whereby, for each combined plume concentration or integrated concentration measurement, an associated reference gas concentration or integrated concentration can be inferred based on the mapping of concentrations or other interpolations or extrapolations. An R-squared value of 1 would imply perfect mixing of the subject gas and reference gas, whereas an R-squared value of zero would imply that the subject gas is completely separate from the reference gas. As described above, however, it is theoretically possible to have a "perfect" calibration without perfect mixing and thus this approach may identify some calibrations as having poor quality, even though the calibration is "perfect."

Similarly, for the correlation approach, one could plot the ratio (at each value of height or wind velocity) between the reference gas and subject gas parametric values, for example, mass flow rate per unit length or mass per unit area, and calculate the coefficient of determination. This also applies to the Same Gas Method whereby the ratio would be the combined flow parameter divided by the subject gas parameter. For example, the combined mass emission rate (C) can be divided by the reference gas discharge rate (R) at each value of height or wind velocity.

Another embodiment of the present invention is to divide the reference gas value (R) by the subject gas value (S), or vice versa, and plot this versus height or length. The plot may be linear, semi-log or logarithmic. A perfect fit would be a constant ratio (i.e. a single value for the ratio) for the full height or length, as is appropriate.

Figure 4:
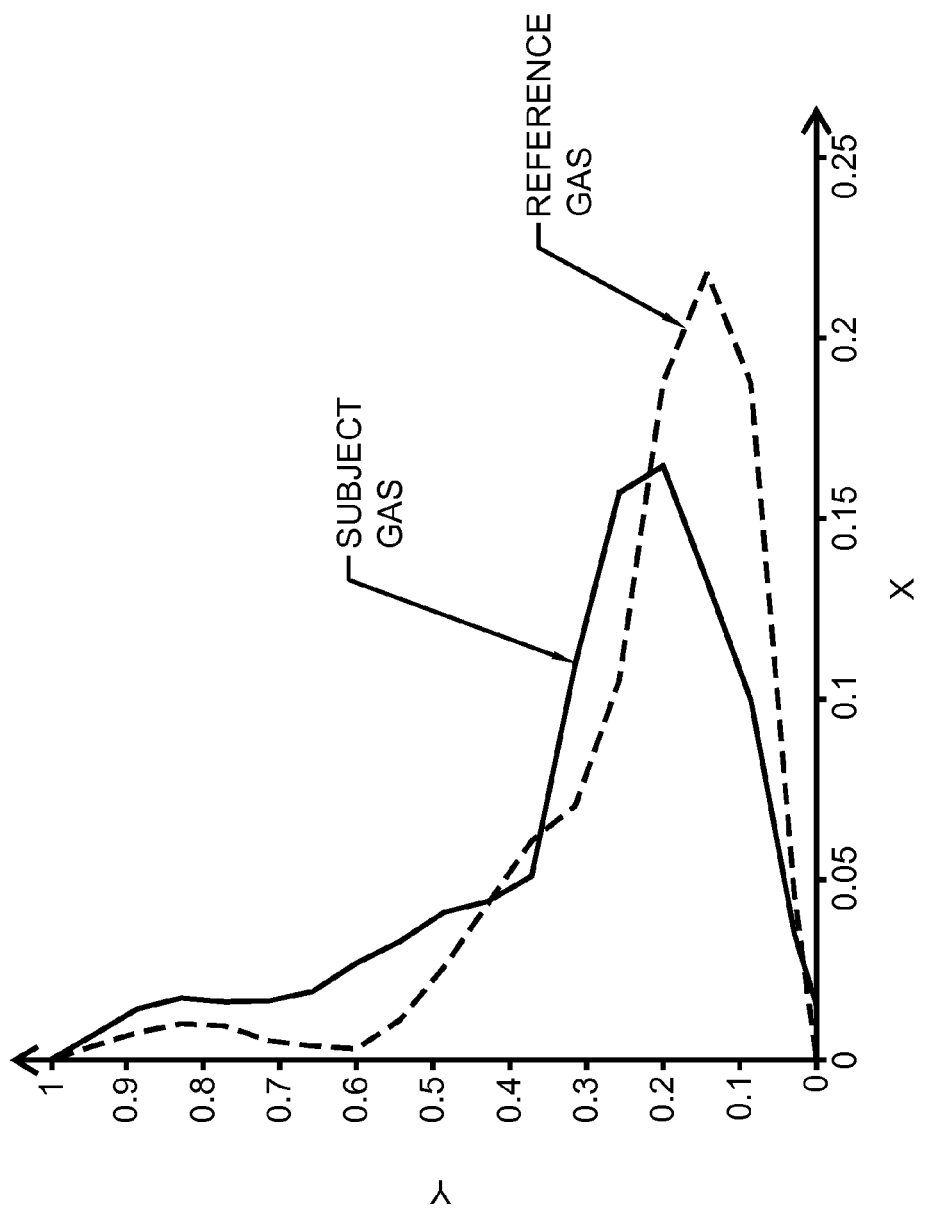
FIG. 4 is a graph showing the application of the integral approach for evaluating the quality of calibration, where X along the X-axis represents a parameter and Y along the Y-axis represents a different parameter suitable for this analysis of the quality of calibration. Subject gas: solid line; reference gas: dashed line.

Another embodiment for evaluating the quality of calibration is shown in FIG. 4 and is referred to herein as the integral approach, whereby X represents a parameter and Y represents a different parameter suitable for this analysis of the quality of calibration. The graphs are illustrative only and are not meant to limit possible configurations of each graph. The X and Y parameter values are then plotted for each of the subject gas and reference gas. A preferred embodiment is for X to be any one of the following parameters: normalized mass per unit length-time or normalized mass per unit area (or integrated concentration); however, X may also be normalized mass flow or normalized mass per unit length. A preferred embodiment is for Y to be any one of the following parameters: height or wind speed/velocity with or without normalization. "Height" is height above ground surface where concentration or integrated concentration measurements are made.

For measurement methods involving vertical or near vertical measurement beams or paths, a preferred embodiment is for X to be horizontal length and Y to be mass per unit area, as in FIG. 4.

Normalization with respect to totalized values is a preferred embodiment because it allows a visual comparison of the quality of calibration. For example, if the parameter is mass per unit area, the normalizing value may be the totalized mass per unit length (the integral of the mass per unit area versus height plot) or simply mass (assuming a unit length of one unit for the purpose of plotting). If the parameter is mass per unit length-time, the normalizing value may be the total flow rate per unit length (the integral of the mass per unit length-time versus height plot) or simply flow rate (assuming a unit length of one unit for the purpose of plotting). Other normalizing values of convenience, however, may also be used.

Persons skilled in the art would also recognize that other similar parameters may be used. For example, volume may be substituted for mass, if the correct conversion factor is applied.

The greater the intersecting area common to both graphs for each of the subject gas and reference gas (or combined plume and subject gas plume for the Same Gas Method), the better the quality of the calibration.

The quality of a calibration is quantified by dividing the intersecting common area to the graphs of normalized parameters associated with the reference gas and subject gas, by the total area associated with either the subject gas or reference gas. This value is the proportion of parametric value overlap between the subject gas and reference gas, and provides a physical sense of the degree of mixing. A table of values can then be developed to assign classes or grades for the calibration to indicate a quality of calibration. For example, a suitable quality of calibration may be indicated when the intersecting area common to both graphs is from about 20-100%, or any amount therebetween, or when the intersecting area common to both graphs is, for example, about 20, 30, 40, 50, 60, 70, 80, 90, 100%, or any amount therebetween (see, for example, FIGS. 4 and 5 and supporting text).

As an example, for a plot of the mass per length-time versus height, the flow of airborne matter or gas per unit length is calculated for the corresponding length or height, depending on the fugitive emission rate measurement method used. The intersecting area common to both graphs is compared to the total area of the normalized values for one of the parameters to derive the fraction or percentage of the common area compared with the total area for one of the parameters under each plot. This fraction or percentage can then be compared to a relationship between these values and definitions of the quality of calibration.

The different approaches for evaluating the quality of calibration can be expanded to the full two dimensional cross-section through a plume. For such an evaluation, however, the variation of wind velocity in two dimensions would need to be known or modelled to benefit from this additional degree of sophistication.

The present invention further provides software comprising statements and instructions for calibrating a fugitive emission rate measurement and for evaluation the quality of calibration. In addition, the present invention provides software comprising statements and instructions for obtaining a 2-D tracer method emission rate measurement, as described herein.

To gain a better understanding of quality of calibration and the evaluation of such quality of calibration as described herein, the following examples are set forth. It will be understood that these examples are intended to describe illustrative embodiments of the invention and are not intended to limit the scope of the invention in any way.

EXAMPLES

Example 1

Figure 5:
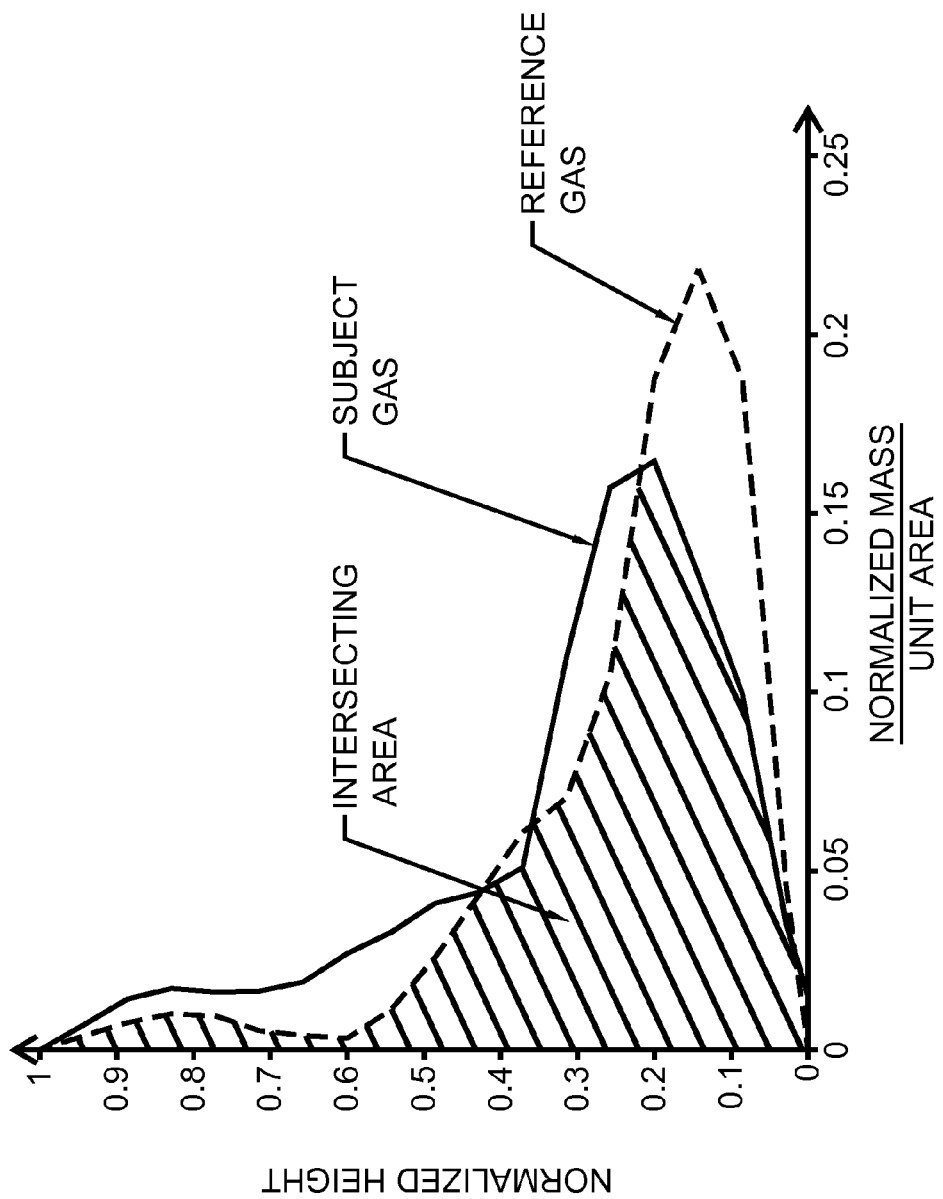
FIG. 5 is a graph showing the results of a calibration of a mass balance approach method where the normalized height above the ground surface is plotted along the Y-axis against the measured normalized mass per unit area along the X-axis for both the subject gas and the reference gas. The intersecting area common to both the subject gas (solid line) and reference gas (dashed line) is hatched.

This example, as illustrated in FIG. 5, shows results of a calibration of an Airborne Matter Mapping (AMM) method measurement whereby the normalized height above the ground surface is plotted against the measured normalized mass per unit area for both the subject gas and the reference gas. In this example, height is normalized with respect to a selected height of convenience that is at or above the height of the plumes. The mass per unit area of the subject gas is normalized with respect to the total mass per unit length (or mass, assuming a unit length of one unit) of the subject gas, and similarly the reference gas is normalized with respect to the total mass per unit length (or mass, assuming a unit length of one unit) of the reference gas. It is a preferred embodiment that these be real values. Modelled values, however, may be used as well as an approximation. The intersecting area common to both graphs in FIG. 5 is shown as a shaded area and is 81% of the total area under (i.e., between the graph and the vertical axis) either the subject gas or reference gas graphs. In a physical sense, this means that 81% of the subject gas flow is "mixed" with the reference gas and this 81% of the subject gas is "perfectly" calibrated.

Example 2

Another example is shown in FIG. 6. This example shows the results of a calibration of an emission measurement method that measures integrated concentrations along the vertical or near vertical. Such measurement methods include solar occultation flux, Total Plume, MAMAP and satellite measurements. The measured normalized mass per unit area is plotted against the horizontal length for both subject gas and reference gas. The common area is shown as a shaded area and is 80% of the total area. For this example, however, this does not mean that 80% of the subject gas flow is "mixed" with the reference gas. The vertical distribution of the gases cannot be discerned from vertical integrated concentration measurements that are obtained as the measurements are not distance resolved.

Methods that rely on measurement of vertical or near vertical integrated concentrations normally cannot have a high quality of calibration because the vertical extent of mixing of the subject gas and reference gas cannot be evaluated using the vertical integrated concentration values alone. If it is known, however, that the subject gas is well mixed with the reference gas (for example, if the emission distribution pattern from the source is known and the release pattern of the reference gas reasonably mimics this emission pattern), then one could infer a high confidence in the calibration.

Example 3

This example presents the results of a calibrated fugitive methane emission rate measurement from a landfill using the Same Gas Method described above. The fugitive emission rate measurements were performed using the Airborne Matter Mapping (AMM) method (which is known to those skilled in the art), and the release of a standard (i.e., a controlled release of methane). This example, therefore, involves the release and measurement of a reference gas that is the same composition as the subject gas, which differs from the method used by Scharff et al. (2003). The inverse modeling method used by Scharff et al. involved the release and measurement of a standard that was different from the gas emitted by the source of interest (thereby requiring an instrument or separate instruments that could measure both gases). In this example, two rounds of AMM method measurements were carried out using an instrument capable of measuring only one gas type. One measurement was during the controlled release of methane (i.e., the standard; referred to in this example as the "Release monitoring round"), and one without the controlled release to measure the fugitive methane emission rate from the landfill (referred to in this example as the "Neutral monitoring round"). The measured fugitive emission rate of the methane from the landfill was calibrated using the adjusted parameters method of calibration as described herein.

The AMM method measurements, the controlled release procedure and the methods used for analyzing the data and the calibration are described in more detail in Wong and Ramkellawan (2013).

Emission Rate Measurement.

In this example, an anisotropy value of 2 was assumed and the upwind flux plane contribution was subtracted. With these assumptions, the AMM method calculated methane emission rate was 2.65 g/sec for the Release monitoring round and 0.87 g/sec for the Neutral monitoring round, for a difference of 1.78 g/sec attributed to the controlled release of methane (the standard). By comparison, the actual average methane discharged from the compressed gas cylinder during this period was 1.89 g/sec. This is a difference of −5.7% relative to the actual average methane discharged during this period (i.e., the AMM method measurement was 5.7% less than the actual average methane release rate from the compressed gas cylinder). The Neutral monitoring round provided a measurement of the emission rate from the landfill at solely one point in time. Assessment of the effect of weather conditions and seasonal factors on the annual average emission rate from a source would require more than the single measurement round that was conducted.

Calibration.

The methane discharge rate attributed to the controlled release of methane, as measured using the AMM method, was calibrated to the actual methane discharged from the compressed gas cylinder by utilizing a Surfer gridding anisotropy value of 1.4. Only the anisotropy value for the gridding in Surfer was adjusted, because it was the assumed parameter that had the greatest uncertainty and does not have an established methodology for its determination. The calibration resulted in a match between the AMM method measured methane discharge rate, attributed to the controlled release of methane, and the actual release rate as measured by the orifice flow meter at the compressed gas cylinder. At this value, comparison of the two measurement methods resulted in a difference of flow rates of less than 1%. Based on this calibration, the emission rate of methane from the portion of the landfill that was measured was 0.87 g/sec.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

One or more preferred embodiments have been described by way of example. The present invention includes all embodiments, modifications or variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention to achieve the same result in substantially the same way, including variations in the method of calculation or the order of steps of the described procedures to arrive at essentially the same result as already described herein.

What is claimed is:

1. A method for measuring a fugitive emission rate of a subject gas from an emission source comprising,
    (a) discharging a reference gas from a gas tank or liquefied gas tank at a measured discharge rate from a reference gas source located within, or near to, the emission source, the reference gas having a composition the same as, or similar to that of, the subject gas;
    (b) measuring a combined fugitive emission rate of the subject gas and the reference gas using a method of fugitive emission rate measurement;
    (c) turning off the reference gas source and measuring the fugitive emission rate of the subject gas using the method;
    (d) obtaining a measurement of a magnitude of the deviation between step (b) and step (c), and correcting the emission rate of the subject gas to obtain a corrected emission rate; and
    (e) using the corrected emission rate to determine an accurate measurement of the fugitive emission rate from the emission source.

2. The method of claim 1, wherein prior to the step of discharging step a), step c) is performed with the method of fugitive emission rate measurement applied to the subject gas, and in step d) the measurement of a magnitude of the deviation is obtained between step (b) and the step of measuring the fugitive emission rate of the subject gas, and the measurement of the magnitude of the deviation is used to correct the emission rate of the subject gas to obtain a corrected emission rate.

3. The method of claim 2, wherein the step of measuring the fugitive emission rate of the subject gas uses an instrument housed in a satellite.

4. The method of claim 1, wherein the method further comprises a step (f) of evaluating a quality of the corrected emission rate using a correlation approach or an integral approach.

5. The method of claim 1, wherein in the step of measuring (step b) and in the step of turning off (step c), the method of measuring the combined fugitive emission rate of the subject gas and the reference gas, and the method of measuring the fugitive emission rate of the subject gas uses an instrument housed in a satellite.

6. A non-transitory computer readable memory having recorded thereon statements and instructions for execution by a computer to carry out the method of claim 1.

7. A method for determining a quality of a fugitive emission rate measurement of a subject gas from an emission source comprising,
    (a) discharging a reference gas from a gas tank or liquefied gas tank at a measured discharge rate from a reference gas source located within, or near to, the emission source, the reference gas having a different composition to that of the subject gas;
    (b) measuring a fugitive emission rate of the subject gas and the fugitive emission rate of the reference gas using a method of fugitive emission rate measurement;
    (c) obtaining a measurement of a magnitude of the deviation between the fugitive emission rate of the reference gas and the discharge rate of the reference gas from the reference gas source, and correcting the emission rate of the subject gas to obtain a corrected emission rate;
    (d) evaluating a quality of the corrected emission rate by using a correlation approach or an integral approach; and
    (e) using the corrected emission rate to determine an accurate measurement of the fugitive emission rate from the emission source.

8. The method of claim 7, wherein in the step of evaluating (step d), the quality of the corrected emission rate is obtained using the integral approach.

9. The method of claim 7, wherein in the step of measuring (step b), the method of fugitive emission rate measurement involves obtaining one or more than one concentration or integrated concentration measurement wholly or partly between 15 m and 150 m above a ground surface.

10. A non-transitory computer readable memory having recorded thereon statements and instructions for execution by a computer to carry out the method of claim 7.

11. A method of measuring a fugitive emission rate of a subject gas from an emission source comprising,
    (a) discharging a reference gas from a gas tank or liquefied gas tank at a measured discharge rate from a reference gas source located within, or near to, the emission source, the reference gas having a different composition to that of the subject gas;
    (b) measuring concentrations or, integrated concentrations of the subject gas in a two dimensional vertical surface within a subject gas emission plume to obtain a two-dimensional integrated mass per unit length, or mass, of the subject gas emission plume; and measuring concentrations or integrated concentrations of the reference gas in a two dimensional vertical surface within a reference gas emission plume to obtain a two-dimensional integrated mass per unit length, or mass, of the reference gas emission plume; and
    (c) determining an emission rate by either:
        i) dividing the two-dimensional integrated mass per unit length of the subject gas emission plume by the two-dimensional integrated mass per unit length of the reference gas emission plume, to obtain a quotient, and multiplying the quotient by the measured discharge rate from the reference gas source thereby obtaining the emission rate; or
        ii) dividing the mass of the subject gas emission plume by the mass of the reference gas emission plume, to obtain a quotient, and multiplying the quotient by the measured discharge rate from the reference gas source thereby obtaining the emission rate; and
    (d) using the emission rate to determine a measurement of the fugitive emission rate of the subject gas from the emission source.

12. The method of claim 11, wherein the step of using (step d) further comprises a step of applying a wind profile factor to the measurement of the fugitive emission rate of the subject gas.

13. The method of claim 11, wherein the method further comprises a step (e) of evaluating a quality of the measurement of the fugitive emission rate of the subject gas using an integral approach.

14. A non-transitory computer readable memory having recorded thereon statements and instructions for execution by a computer to carry out the method of claim 11.

\* \* \* \* \*